United States Patent
Lin et al.

(10) Patent No.: US 12,496,379 B2
(45) Date of Patent: Dec. 16, 2025

(54) ABSORBABLE IMPLANTABLE DEVICE

(71) Applicant: BIOTYX MEDICAL (SHENZHEN) CO., LTD, Guangdong (CN)

(72) Inventors: Wenjiao Lin, Shenzhen (CN); Dong Bian, Shenzhen (CN)

(73) Assignee: BIOTYX MEDICAL (SHENZHEN) CO., LTD, Shenzhen (CN)

( * ) Notice: Subject to any disclaimer, the term of this patent is extended or adjusted under 35 U.S.C. 154(b) by 1116 days.

(21) Appl. No.: 17/288,184

(22) PCT Filed: Oct. 31, 2019

(86) PCT No.: PCT/CN2019/114692
§ 371 (c)(1),
(2) Date: Apr. 23, 2021

(87) PCT Pub. No.: WO2020/125227
PCT Pub. Date: Jun. 25, 2020

(65) Prior Publication Data
US 2021/0402068 A1  Dec. 30, 2021

(30) Foreign Application Priority Data
Dec. 18, 2018  (CN) .......................... 201811548943.2

(51) Int. Cl.
*A61L 31/14* (2006.01)
*A61L 31/08* (2006.01)
*A61L 31/10* (2006.01)
*A61L 31/16* (2006.01)

(52) U.S. Cl.
CPC .......... *A61L 31/148* (2013.01); *A61L 31/088* (2013.01); *A61L 31/10* (2013.01); *A61L 31/16* (2013.01)

(58) Field of Classification Search
None
See application file for complete search history.

(56) References Cited

U.S. PATENT DOCUMENTS

| 11,020,514 | B2* | 6/2021 | Qi | .......................... A61L 31/148 |
| 2005/0209680 | A1 | 9/2005 | Gale et al. | |
| 2006/0106455 | A1* | 5/2006 | Furst | .......................... A61F 2/82 623/1.31 |
| 2007/0156231 | A1* | 7/2007 | Weber | .......................... A61F 2/82 623/1.38 |
| 2010/0010620 | A1 | 1/2010 | Weber | |
| 2016/0263287 | A1 | 9/2016 | Zhang et al. | |
| 2017/0333231 | A1* | 11/2017 | Li | .......................... A61L 27/04 |
| 2019/0022284 | A1* | 1/2019 | Qi | .......................... A61L 31/086 |

FOREIGN PATENT DOCUMENTS

| CN | 105636618 A | 6/2016 |
| CN | 106474545 A | 3/2017 |
| CN | 108261559 A | 7/2018 |
| JP | 2009537286 A | 10/2009 |
| JP | 2013135929 A | 7/2013 |
| KR | 20120117584 A | 10/2012 |
| WO | WO-2017117923 A1 * | 7/2017 .......... A61L 27/00 |

OTHER PUBLICATIONS

International Search Report issued on Jan. 23, 2020 in corresponding International Application No. PCT/CN2019/114692; 6 pages.
Chinese Office Action issued on Nov. 3, 2020 in corresponding International Application No. 201811548943.2; 10 pages.
Office Action issued on May 3, 2023, in corresponding Korean Application No. 10-2021-7019362, 15 pages.
Extended Search Report issued on Jul. 25, 2022, in corresponding European Application No. 19897926.2, 12 pages.
Borhani et al., "Cardiovascular Stents: Overview, Evolution, and Next Generation", Progress in Biomaterials, Sep. 10, 2018, vol. 7, No. 3, pp. 175-205.
Wenjiao et al., "In Vivo Degradation and Endothelialization of an Iron Bioresorbable Scaffold", Bioactive Materials, Apr. 1, 2021, vol. 6, No. 4, pp. 1028-1039.
Min-Ho et al., "An Asymmetric Surface Coating Strategy for Improved Corrosion Resistance and Vascular Compatibility of Magnesium Alloy Stents", Materials and Designs, Sep. 26, 2020, vol. 196, pp. 109-182.
Office Action issued on May 31, 2022, in corresponding Indian Application No. 202127023092, 5 pages.
Office Action issued on Sep. 6, 2023, in corresponding Japanese Application No. 2021-527920, 17 pages.
Office Action issued on Jun. 1, 2023, in corresponding Japanese Application No. 2021-527920, 6 pages.
Office Action issued on Dec. 14, 2023, in corresponding Japanese Application No. 2021-527920, 8 pages.
Office Action issued on Jul. 20, 2023, in corresponding Korean Application No. 10-2021-7019362, 15 pages.

* cited by examiner

*Primary Examiner* — Ali Soroush
*Assistant Examiner* — Afua Bamfoaa Boateng
(74) *Attorney, Agent, or Firm* — Maier & Maier, PLLC (57) ABSTRACT

An absorbable implantable device, including an iron-based substrate, and a zinc-containing protective layer and a corrosion promoting layer provided on the iron-based substrate. The iron-based substrate has an outer wall and an inner wall. The zinc-containing protective layer covers the outer wall and the inner wall of the iron-based substrate. The corrosion promoting layer covers the zinc-containing protective layer. The thickness ratio of the zinc-containing protective layer located on the outer wall to the corrosion promoting layer located on the outer wall is less than the thickness ratio of the zinc-containing protective layer located on the inner wall to the corrosion promoting layer located on the inner wall. The absorbable implantable device has a low risk of thrombosis and can meet the requirements of early support and later rapid corrosion.

14 Claims, 3 Drawing Sheets

ABSORBABLE IMPLANTABLE DEVICE

TECHNICAL FIELD

The embodiments relate to the field of interventional medical devices, and in particular to an absorbable implantable device.

BACKGROUND

Cardiovascular disease is one of the major diseases threatening human health in the $21^{st}$ century, and the implantation of an endovascular stent is an effective treatment method. At present, bare metal stents and drug eluting stents widely used clinically are inert stents; and these stents will be left in the body for a long time after implantation. Due to the long-term existence in the body, the stent stimulates vascular walls to cause inflammation. Moreover, some reasons, e.g., the dissolution of harmful ions in the stent may result in restenosis and late thrombosis. Even in case of the optimal condition of free from the occurrence of the above complications, the long-term caging resulting from the metal stent also will cause the physiological functions of the stented blood vessel segment to be different from the normal blood vessel. The ideal intravascular stent can provide sufficient mechanical support for the injured blood vessel in early stage and should be degraded and absorbed by the body without any residuals at a proper rate without causing local and systemic toxicity after the blood vessel healing, thus solving the problems existing for the traditional inert stents, such as restenosis and late thrombosis. Based on the above clinical demands, a novel degradable metal stent with excellent properties the same as the traditional metal stent emerges.

With the continuous in-depth research on degradable metals and the continuous improvement in the preparation and processing technologies of materials related, the degradable metal stents have been transformed into actual products from concepts; further, the related devices have come into the stages of animal experiments and clinical trials; moreover, some products have been gradually approved on the market. Currently, the degradable metal stent can be divided into three categories according to the materials thereof: degradable magnesium-based alloy stent, degradable zinc-based alloy stent, and degradable iron-based alloy stent. The degradable magnesium-based alloy stent is a degradable metal stent system which has been researched most thoroughly and at the earliest. Related researchers have conducted a large number of animal experiments and clinical trials. The Magmaris magnesium alloy drug eluting stent developed by Biotronik has been CE marked for market in 2016. Recently, successive clinical reports have indicated that the magnesium alloy intravascular stent has the shortcomings of too fast degradation and premature collapse, thus resulting in restenosis. In addition, the clinical application range of the magnesium alloy stent is limited due to its incomplete specification coverage and weak mechanical support. In recent years, people have begun to concern the degradable Zn-based alloy stent, and the research on the stent started fairly late. At present, people mainly focus on the related issues of materials science, and sometimes animal experiments are reported. Therefore, its application prospect is not clear temporarily. The degradable iron-based alloy stent has mechanical properties comparable with those of the materials of traditional metal stents, such as stainless steel, and cobalt-chromium alloy stents; and its biocompatibility has been also verified by theories and animal experiments. Therefore, the degradable iron-based alloy stent is very promising. Unlike the magnesium alloy stent, the degradation rate of the degradable iron-based alloy stent is too slow, which is the major problem faced in clinical application. The key to achieve successful practical application of the degradable iron-based alloy stent is how to accurately regulate and control the degradation behavior thereof to ensure its structural integrity (no or little degradation) at the early stage of implantation, thereby providing sufficient mechanical support until vascular repairing is completed; and to ensure accelerated degradation of the stent, thus restoring the normal physiological functions of the blood vessel.

Previous studies have shown that a zinc-containing protector was provided on the surface of an iron-based stent to protect the iron-based stent from corrosion after being implanted for a certain period of time. However, the zinc-containing protector can delay the starting time of the corrosion of the iron-based stent but cannot solve the problem of too slow corrosion of the iron-based stent in later period, and even extends the cycle of the complete corrosion of the iron-based stent to a certain extent. Moreover, the zinc-containing protector continuously releases zinc ions in the corrosion process, and if excessive zinc ions get into blood within a short time, it may cause hemolysis and secondary coagulation, thus increasing the risk of thrombosis.

SUMMARY

In view of this, it is necessary to provide an absorbable implantable device with a low risk of thrombosis that is capable of satisfying the requirements of early support and later rapid corrosion.

An absorbable implantable device including an iron-based substrate, the iron-based substrate having an outer wall and an inner wall, the absorbable implantable device further includes a zinc-containing protective layer and a corrosion promoting layer disposed on the iron-based substrate; where the zinc-containing protective layer covers the outer wall and the inner wall of the iron-based substrate; the corrosion promoting layer covers the zinc-containing protective layer; the thickness ratio of the zinc-containing protective layer located on the outer wall to the corrosion promoting layer located on the outer wall is less than the thickness ratio of the zinc-containing protective layer located on the inner wall to the corrosion promoting layer located on the inner wall.

The absorbable implantable device is provided with a zinc-containing protective layer coating the iron-based substrate and a corrosion promoting layer coating the zinc-containing protective layer; the zinc-containing protective layer protects the iron-based substrate through a sacrificial anode principle, meanwhile, a corrosion product formed by the corrosion of the zinc-containing protective layer can also participate in the formation of a passivation film, thus avoiding the premature corrosion of the iron-based substrate. Moreover, the corrosion promoting layer can accelerate the corrosion of the iron-based substrate in the later period; and the corrosion promoting layer may protect the zinc-containing protective layer to some extent. The thickness ratio of the zinc-containing protective layer located on an outer wall of the iron-based substrate to the corrosion promoting layer located on the outer wall is less than the thickness ratio of the zinc-containing protective layer located on the inner wall to the corrosion promoting layer located on the inner wall; and the above configuration can prevent zinc ions from being released rapidly in a short period to significantly increase the thrombogenicity of the absorbable implantable device before endothelialization after implantation into a body, thus reducing the risk of thrombosis.

DETAILED DESCRIPTION OF THE EMBODIMENTS

To make the above objectives, features and advantages of the embodiments more understandable, the detailed embodiments will be described hereafter by reference to the accompanying drawings. In the following description, numerous specific details are set forth to provide a thorough understanding of the embodiments. The embodiments can be implemented in other modes different from those set forth herein; and a person of ordinary skill in the art can make similar improvements without departing from the spirit and scope of the embodiments. Therefore, the embodiments is not limited by the embodiments hereafter.

Unless defined otherwise, all terms used herein have the same meanings as commonly understood by a person of ordinary skill in the art of the embodiments. The terms used herein are for the purpose of describing particular embodiments only and are not limiting. As used herein, the term "and/or" includes any and all combinations of one or more of the associated items listed.

Figure 1:
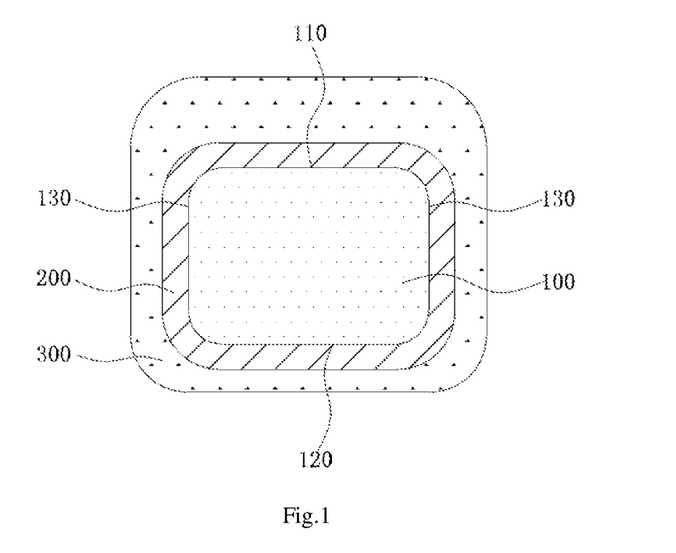
FIG. 1 is a cross-sectional view of an absorbable implantable device in one embodiment.

Referring to FIG. 1, an absorbable implantable device in one embodiment includes an iron-based substrate 100. The iron-based substrate 100 is a hollowed-out lumen structure. The iron-based substrate 100 is provided with an outer wall 110, an inner wall 120 and side walls 130.

In one embodiment, the iron-based substrate 100 is made of pure iron or an iron alloy. The pure iron has a purity of not less than 99.9 wt. %. Alloying elements in the iron alloy are selected from at least one of carbon, nitrogen, phosphorus, silicon, sulfur, boron, cobalt, tungsten, manganese, tin, magnesium, zinc, zirconium, calcium, titanium, copper, gold, silver, platinum and palladium. In an example, the iron-based substrate 100 is made of nitrided iron having a nitrogen content of 0.05-0.1 wt. %. The iron-based substrate 100 prepared by the pure iron or iron alloy has excellent mechanical properties and a proper corrosion rate, beneficial to meeting the requirements of early support and later rapid corrosion of the iron-based substrate 100.

In other embodiments, the iron-based substrate 100 may be made of other materials including any iron-based material having iron as a main component capable of benefiting to meeting the requirements of early support and later rapid corrosion of the iron-based substrate 100.

The absorbable implantable device further includes a zinc-containing protective layer 200 and a corrosion promoting layer 300 disposed on the iron-based substrate 100.

The zinc-containing protective layer 200 covers the outer wall 110, inner wall 120 and the side walls 130 of the iron-based substrate 100. The zinc-containing protective layer 200 is made of pure zinc or a zinc alloy. The pure zinc has a purity of not less than 99.9 wt. %. Alloying elements in the zinc alloy are selected from at least one of sodium, potassium, magnesium, lithium, calcium, strontium, manganese, iron, tin, germanium, boron, silicon, copper, bismuth, silver and zirconium. It should be noted that the content of the above alloying elements is insufficient to cause toxicity to human body.

The zinc-containing protective layer 200 covers on the outer wall 110, inner wall 120 and the side walls 130 of the iron-based substrate 100. After implantation of the absorbable implantable device, the zinc-containing protective layer 200 is preferentially corroded to retard the corrosion of the iron-based substrate 100; and corrosion products of the zinc-containing protective layer 200 are adhered on the outer wall 110, inner wall 120 and the side walls 130 of the iron-based substrate 100 to form a passivation film to further protect the iron-based substrate 100, thus further delaying the time point of the corrosion initiation of the iron-based substrate 100 and facilitating the maintenance of its structural integrity in the early stage of implantation, and thereby providing sufficient radial support for the blood vessel to assist in vascular repair and reconstructing.

In one embodiment, as shown in FIG. 1, the zinc-containing protective layer 200 completely covers the outer wall 110, inner wall 120 and the side walls 130 of the iron-based substrate 100 to comprehensively protect the iron-based substrate 100 and delay the time point of the corrosion initiation of the iron-based substrate 100.

After the absorbable implantable device is implanted into a blood vessel, the inner wall 120 of the iron-based substrate 100 contacts the blood; and the zinc-containing protective layer 200 completely covers the inner wall 120 of the iron-based substrate 100, thus effectively protecting the iron-based substrate 100.

In one embodiment, the zinc-containing protective layer 200 completely covers the inner wall 120 of the iron-based substrate 100, and the zinc-containing protective layer 200 only partially covers the outer wall 110 of the iron-based substrate 100 so that the outer wall 110 of the iron-based substrate 100 is corroded faster than the inner wall 120 thereof, which facilitates that the corrosion initiates from the outer wall 110 of the iron-based substrate 100 after vascular repair, and facilitates the acceleration of the complete corrosion of the iron-based substrate 100 in the later period.

The corrosion promoting layer 300 covers the zinc-containing protective layer 200. The corrosion promoting layer 300 is made of a material which can produce acidic products during degradation to locally create a low-pH environment to promote the corrosion of the iron-based substrate 100, so that the corrosion promoting layer 300 can accelerate the corrosion of the iron-based substrate 100 after vascular repair is completed. In one embodiment, the corrosion promoting layer 300 includes a degradable polymer. The degradable polymer is selected from at least one of degradable polyesters and degradable anhydrides.

In one embodiment, the degradable polyester is selected from at least one of polylactic acid, polyglycolic acid, poly(lactic-co-glycolic acid), polycaprolactone, polyacrylate, polyhydroxyalkanoate, polysuccinate, salicylic acid-based poly(anhydride-ester), polytrimethylene carbonate, polydioxanone, poly(beta-alkanoate), poly(beta-hydroxybutyrate), polyethylene glycol oxalate and poly(hydroxybutyrate-hydroxyvalerate). The degradable polyanhydride is selected from at least one of poly-1,3-bis(p-carboxyphenoxy)propane-decanedioic acid, polyerucic acid dimer-decanedioic acid and polyfumaric acid-decanedioic acid.

In one embodiment, the degradable polymer is copolymerized by at least two of the monomers forming the above degradable polyester and monomers forming the above degradable anhydride.

After the absorbable implantable device is implanted into a lesion, the zinc-containing protective layer 200 and the corrosion promoting layer 300 are corroded or degraded continuously before the iron-based substrate 100 initiates corrosion; and the zinc-containing protective layer 200 interacts with the corrosion promoting layer 300.

For example, the zinc-containing protective layer 200 is corroded in an organism to generate zinc phosphate; and zinc phosphate reacts with the iron-based substrate 100 to generate an adhesive Fe—Zn—$P_2O_5$ compound film; and the Fe—Zn—$P_2O_5$ compound film covers on the iron-based substrate 100 to passivate the iron-based substrate 100. Meanwhile, the zinc phosphate may form a complex with the corrosion promoting layer 300. For example, zinc phosphate forms a complex with the polymer in the corrosion promoting layer 300; and the complex may react with the corrosion products of the iron-based substrate 100 to form a tight protective film on the iron-based substrate 100 as well. The process relates to two aspects of reaction, one is that the phosphate reaches the zinc-containing protective layer 200 after penetrating the corrosion promoting layer 300 and reacts with zinc of the zinc-containing protective layer 200 to generate solid zinc phosphate; and another one is that the solid zinc phosphate also may be gradually dissolved and diffused to tissues after penetrating the corrosion promoting layer 300.

When the corrosion promoting layer 300 is too thick, it is difficult for the phosphate to penetrate the corrosion promoting layer 300 into the zinc-containing protective layer 200, and accordingly, less solid zinc phosphate is produced. Meanwhile, due to the excessive thickness of the corrosion promoting layer 300, the degradation of the polymer results in too low pH of the relatively closed inner environment and a larger solubility product of the zinc phosphate, which further reduces the amount of solid zinc phosphate. Accordingly, there is a small amount of solid zinc phosphate adhered on the iron-based substrate 100 and finally forming a passivation film, which is difficult to delay the corrosion initiation of the iron-based substrate 100. However, when the corrosion promoting layer 300 is too thin, the zinc phosphate easily diffuses into the surrounding tissues instead of reacting with the corrosion promoting layer 300 to form a tight protective film adhered on the iron-based substrate 100, thereby making it difficult to play a role in delaying the corrosion initiation of the iron-based substrate 100.

The degradable polymer in the corrosion promoting layer 300 can complex zinc; therefore, the corrosion promoting layer 300 plays a role of corrosion inhibition to a certain extent, thus preventing the zinc-containing protective layer 200 from being corroded too fast. At the same time, after the absorbable implantable device is implanted into the body, the corrosion promoting layer 300 may be continuously degraded to release low molecular weight products or polymer monomers. These low molecular weight products or polymer monomers have a corrosive effect on the zinc-containing protective layer 200. When the corrosion promoting layer 300 is thinner, accordingly, there is a small amount of degradable polymers in the corrosion promoting layer 300, so that the protection effect of the corrosion promoting layer 300 on the zinc-containing protective layer 200 is stronger than the corrosion effect thereof; thereby, the corrosion of the zinc-containing protective layer 200 slows down with the increase of the amount of the degradable polymers. When the thickness of the corrosion promoting layer 300 reaches to a certain value, and accordingly, the amount of the degradable polymers is up to a certain degree, the corrosion effect of the corrosion promoting layer 300 on the zinc-containing protective layer 200 starts to be greater than the protection effect thereof; and at this time, the corrosion of the zinc-containing protective layer 200 is accelerated with the increase of the amount of the degradable polymers.

When the zinc-containing protective layer 200 is corroded too quickly, on the one hand, the too fast corrosion will render the iron-based substrate 100 to lose its protection effect relatively quickly, thus making it difficult to delay the corrosion initiation, and on the other hand, the too fast corrosion will result in thrombosis easily due to the high content of zinc ions.

However, when the corrosion promoting layer 300 is too thin, the corrosion promoting layer 300 is continuously degraded, and may be degraded largely or even degraded completely in early stage; therefore, there are no sufficient degradation products to promote the rapid corrosion of the iron-based substrate 100 in later period after vascular repair is completed.

Therefore, too thick or thin corrosion promoting layer 300 is disadvantageous to protect the zinc-containing protective layer 200, thus it is difficult to protect the iron-based substrate 100 and to achieve the purpose of delaying the corrosion initiation of the iron-based substrate 100. Moreover, when the corrosion promoting layer 300 is too thick relative to the zinc-containing protective layer 200, or when the zinc-containing protective layer 200 is too thin relative to the corrosion promoting layer 300, it is also difficult to achieve the purpose of delaying the corrosion initiation of the iron-based substrate 100.

The thickness of the corrosion promoting layer 300 matches the thickness of the zinc-containing protective layer 200 preferably, so that the degradation rate of the corrosion promoting layer 300 matches the corrosion rate of the zinc-containing protective layer 200, thus facilitating the early protection of the zinc-containing protective layer 200 and avoiding the too fast corrosion of the zinc-containing protective layer 200 to protect the iron-based substrate 100 better. Further, there are sufficient degradation products of the corrosion promoting layer 300 to create a lower pH environment, thus accelerating the corrosion of the iron-based substrate 100 in later period. Moreover, the corrosion rate of the zinc-containing protective layer 200 is controlled through the corrosion promoting layer 300, so as to avoid the phenomenon that the zinc-containing protective layer 200 corrodes too fast and the concentration of zinc ions accumulated in the blood is too high, resulting in hemolysis and ultimately causing thrombus.

In one embodiment, the thickness ratio of the zinc-containing protective layer 200 located on the outer wall 110 of the iron-based substrate 100 to the corrosion promoting layer 300 located on the outer wall 110 is less than the thickness ratio of the zinc-containing protective layer 200 located on the inner wall 120 to the corrosion promoting layer 300 located on the inner wall 120. In this way, it is conducive to regulating and controlling that the degradation rate of the zinc-containing protective layer 200 located on the outer wall 110 of the iron-based substrate 100 is greater than the degradation rate of the zinc-containing protective layer 200 located on the inner wall 120 of the iron-based substrate 100; and the configuration can avoid the rapid release of zinc ions in a short time to significantly increase the thrombogenicity of the absorbable implantable device before endothelialization after implantation in the body, thereby reducing the risk of thrombosis.

In one embodiment, the corrosion promoting layer 300 completely covers the outer wall 110, inner wall 120 and the side walls 130 of the iron-based substrate 100; that is, the corrosion promoting layer 300 completely covers the zinc-containing protective layer 200, which facilitates the corrosion inhibition of the zinc-containing protective layer 200 to avoid the release of excessive zinc ions into blood, thereby facilitating the prevention of thrombosis.

In a further embodiment, the corrosion promoting layer 300 completely covers the outer wall 110 of the iron-based substrate 100 and only partially covers the inner wall 120 of the iron-based substrate 100; that is, the corrosion promoting layer 300 does not completely cover the zinc-containing protective layer 200 but at least partially exposes a portion of the zinc-containing protective layer 200 located on the inner wall 120. Thus, in the premise of ensuring that the thickness ratio of the zinc-containing protective layer 200 located on the outer wall 110 to the corrosion promoting layer 300 located on the outer wall 110 is less than the thickness ratio of the zinc-containing protective layer 200 located on the inner wall 120 to the corrosion promoting layer 300 located on the inner wall 110, the embodiments also can avoid the rapid release of zinc ions in a short time to significantly increase the thrombogenicity of the absorbable implantable device before endothelialization after implantation in the body, thereby reducing the risk of thrombosis.

Figure 2:
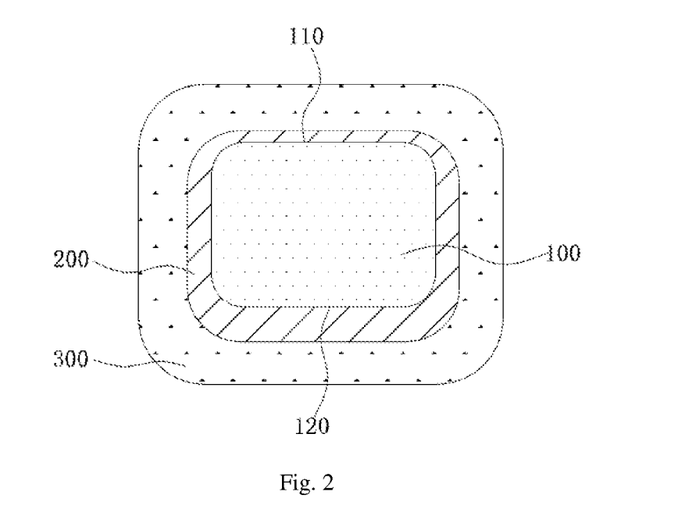
FIG. 2 is a cross-sectional view of an absorbable implantable device in a further embodiment.
Figure 3:
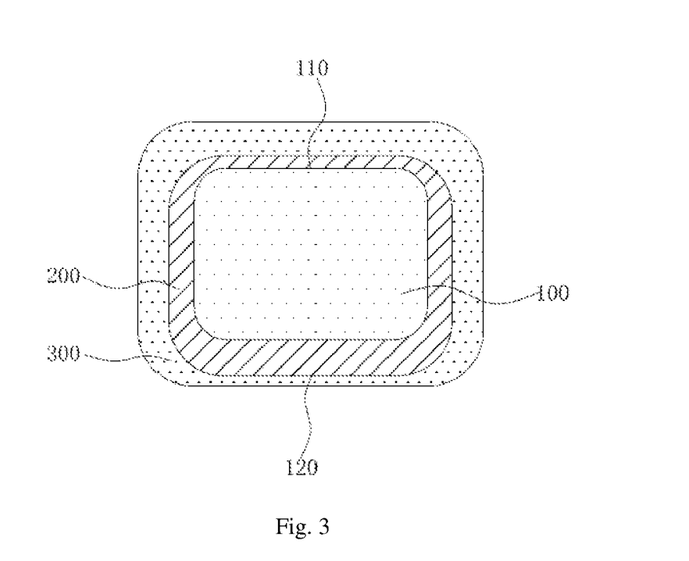
FIG. 3 is a cross-sectional view of an absorbable implantable device in a further embodiment.

In one embodiment, the thickness of zinc-containing protective layer 200 located on the outer wall 110 is not equal to the thickness of the zinc-containing protective layer 200 located on the inner wall 120. For example, as shown in FIG. 2, the thickness of the zinc-containing protective layer 200 located on an outer wall 110 of the iron-based substrate 100 is smaller than the thickness of the zinc-containing protective layer 200 located on the inner wall 120; the corrosion promoting layer 300 is a coating having a uniform thickness; and the thickness of the corrosion promoting layer 300 located on the outer wall 110 is equal to the thickness of the portion located on the inner wall 120. Accordingly, the thickness ratio of the zinc-containing protective layer 200 located on the outer wall 110 of the iron-based substrate 100 to the corrosion promoting layer 300 located on the outer wall 110 is smaller than the thickness ratio of the zinc-containing protective layer 200 located on the inner wall 120 to the corrosion promoting layer 300 located on the inner wall 120. Alternatively, as shown in FIG. 3, the thickness of the zinc-containing protective layer 200 located on an outer wall 110 of the iron-based substrate 100 is smaller than the thickness of the zinc-containing protective layer 200 located on an inner wall 120; and the thickness of the corrosion promoting layer 300 located on an outer wall 110 is greater than the thickness of a portion thereof located on an inner wall 120. Accordingly, the thickness ratio of the zinc-containing protective layer 200 located on the outer wall 110 of the iron-based substrate 100 to the corrosion promoting layer 300 located on the outer wall 110 is less than the thickness ratio of the zinc-containing protective layer 200 located on the inner wall 120 to the corrosion promoting layer 300 located on the inner wall 120.

In a further embodiment, the thickness of the zinc-containing protective layer 200 located on an outer wall 110 is not equal to the thickness of the zinc-containing protective layer 200 located on an inner wall 120; and the thickness of the corrosion promoting layer 300 located on an outer wall 110 is not equal to the thickness of the corrosion promoting layer 300 located on an inner wall 120. By rationally regulating the thickness of the portions of the zinc-containing protective layer 200 and the thickness of the corrosion promoting layer 300 located on the outer wall 110 and inner wall 120, the thickness ratio of the zinc-containing protective layer 200 located on the outer wall 110 of the iron-based substrate 100 to the corrosion promoting layer 300 located on the outer wall 110 is smaller than the thickness ratio of the zinc-containing protective layer 200 located on the inner wall 120 to the corrosion promoting layer 300 located on the inner wall 120.

The thickness ratio of the zinc-containing protective layer 200 located on the outer wall 110 of the iron-based substrate 100 to the corrosion promoting layer 300 located on the outer wall 110 should be less than the thickness ratio of the zinc-containing protective layer 200 located on the inner wall 120 to the corrosion promoting layer 300 located on the inner wall 120 no matter how the thicknesses of the zinc-containing protective layer 200 and the corrosion promoting layer 300 is configured.

The corrosion products of the zinc-containing protective layer 200 are adhered on the iron-based substrate 100 to protect the iron-based substrate 100 and retard the corrosion initiation of the iron-based substrate 100. At the same time, the degradation of the corrosion promoting layer 300 can produce a local low-pH environment to accelerate the corrosion of the iron-based substrate 100. Due to the interaction between the corrosion of the zinc-containing protective layer 200 and the degradation of the corrosion promoting layer 300, the proper zinc-containing protective layer 200 and the proper corrosion promoting layer 300 match mutually in thickness so that both have an appropriate corrosion rate and degradation rate; and the configuration can ensure that the iron-based substrate 100 is not corroded or rarely corroded in the early stage of implantation and can accelerate the corrosion after vascular repair.

In one embodiment, the thickness ratio of the zinc-containing protective layer 200 located on the inner wall 120 to the corrosion promoting layer 300 located on the inner wall 120 is D1, and the value of D1 ranges from 0.08 to 0.38; and the thickness of the zinc-containing protective layer 200 located on the inner wall 120 ranges from 0.4 to 3.6 micrometers. The thickness ratio of the zinc-containing protective layer 200 located on the outer wall 110 to the corrosion promoting layer 300 located on the outer wall 110 is D2, and when D1 is selected from any value in the range of 0.08 to 0.38, D1 is greater than D2.

In one embodiment, the value of D1 ranges from 0.10 to 0.24, and the thickness of the zinc-containing protective layer 200 located on the inner wall 120 ranges from 0.4 to 3.6 microns. When D1 is selected from any value in the range of 0.10 to 0.24, D1 is greater than D2.

In one embodiment, the thickness ratio D2 of the zinc-containing protective layer 200 located on the outer wall 110 to the corrosion promoting layer 300 located on the outer wall 110 ranges from 0.04 to 0.27; and the thickness of the zinc-containing protective layer 200 located on the outer wall 110 ranges from 0.4 to 3.6 microns. When D2 is selected from any value in the range of 0.04 to 0.27, D1 is configured to be greater than D2.

In one embodiment, D2 ranges from 0.04 to 0.12; and the thickness of the zinc-containing protective layer 200 located on the outer wall 110 ranges from 0.4 to 3.6 microns. When D2 is selected from any value in the range of 0.04 to 0.12, D1 is configured to be greater than D2.

In one embodiment, when D1 is selected from any one of 0.08 to 0.38, D2 is selected from one of 0.04 to 0.27, and D1 is greater than D2; moreover, the thickness of the zinc-containing protective layer 200 located on the inner wall 120 ranges from 0.4 to 3.6 microns, and the thickness of the zinc-containing protective layer 200 located on the outer wall 110 ranges from 0.4 to 3.6 microns. The thickness of the zinc-containing protective layer 200 located on the inner wall 120 and the thickness of the portion thereof located on the outer wall 110 may be selected from one of 0.4 to 3.6 microns; and the above two values may be same or different.

In one embodiment, when D1 is selected from any one of 0.10 to 0.24, D2 is selected from one of 0.04 to 0.12, and D1 is greater than D2; moreover, and the thickness of the zinc-containing protective layer 200 located on the inner wall 120 ranges from 0.4 to 3.6 microns; and the thickness of the zinc-containing protective layer 200 located on the outer wall 110 ranges from 0.4 to 3.6 microns. The thickness of the zinc-containing protective layer 200 located on the inner wall 120 and the thickness of the portion thereof located on the outer wall 110 may be selected from one of 0.4 to 3.6 microns; and the above two values may be same or different.

The thicknesses of the zinc-containing protective layer 200 and the corrosion promoting layer 300 is configured according to the multiple embodiments described above to ensure that the thickness of the zinc-containing protective layer 200 located on the inner wall 120 is sufficient to protect the iron-based substrate 100, and the thicknesses ratio of the zinc-containing protective layer 200 to the corrosion promoting layer 300 matches the corrosion rate of the zinc-containing protective layer 200, so that the zinc-containing protective layer 200 interacts with the corrosion promoting layer 300 during the corrosion or degradation process. The protection effect and corrosion promotion effect of the corrosion promoting layer 300 on the zinc-containing protective layer 200 are matched with each other. On the one hand, the configuration avoids too high concentration of zinc ions in blood in a short time caused by the too fast corrosion of the zinc-containing protective layer 200, thus ensuring that the concentration of zinc ions in blood can be lower than the concentration capable of inducing hemolysis; on the other hand, the zinc-containing protective layer 200 and the corrosion promoting layer 300 have an appropriate corrosion rate to regulate the corrosion behavior of the iron-based substrate 100, thus avoiding the premature initiation of corrosion of the iron-based substrate 100 but enabling the rapid corrosion in later period.

The above absorbable implantable device is provided with a zinc-containing protective layer 200 coating an iron-based substrate 100 and a corrosion promoting layer 300 coating the zinc-containing protective layer 200; the zinc-containing protective layer 200 protects the iron-based substrate 100 through a sacrificial anode principle, thus avoiding the premature initiation of the corrosion of the iron-based substrate 100. Meanwhile, the corrosion products formed by the corrosion of the zinc-containing protective layer 200 form a passivation film coated on the iron-based substrate 100, thus further delaying the time point of the corrosion initiation of the iron-based substrate 100; and the corrosion promoting layer 300 can accelerate the later corrosion of the iron-based substrate 100. The corrosion promoting layer 300 may protect the zinc-containing protective layer 200 to some extent. The corrosion rate of the zinc-containing protective layer 200 gradually decreases and then increases with the increase of the thickness of the corrosion promoting layer 300. The thickness ratio of the zinc-containing protective layer 200 located on the outer wall 110 of the iron-based substrate 100 to the corrosion promoting layer 300 located on the outer wall 110 is configured to be smaller than the thickness ratio of the zinc-containing protective layer 200 located on the inner wall 120 to the corrosion promoting layer 300 located on the inner wall 120. Thus, the degradation of the corrosion promoting layer 300 can regulate and control the corrosion rate of the zinc-containing protective layer 200, so as to avoid the rapid release of zinc ions in a short time to significantly increase the thrombogenicity of the absorbable implantable device before endothelialization after implantation in a body, thereby reducing the risk of thrombosis.

In one embodiment, the corrosion promoting layer 300 contains an active substance so that the corrosion promoting layer 300 play the roles of promoting corrosion and controlling the release of the active substance at the same time. In one embodiment, the active substance is distributed on the portions of the corrosion promoting layer 300 located on the outer wall 110, inner wall 120 and the side walls 130. In one embodiment, the active substance is distributed on the portions of the corrosion promoting layer 300 located on the outer wall 110, inner wall 120 and the side walls 130; and the content of the active substance on the outer wall 110 and the side walls 130 is greater than that on the inner wall 120. In one embodiment, the active substance is distributed only on the portions of the corrosion promoting layer 300 located on the outer wall 110 and the side walls 130; and no active substance is distributed on the corrosion promoting layer 300 located on the inner wall 120. The active substance may be any beneficial or therapeutic agent for our human body no matter how the active substance is distributed. For example, the active substance may be an anti-proliferative drug, an anti-restenosis drug, an anti-thrombotic drug, or an anti-sensitizing drug, and the like.

In one embodiment, when the absorbable implantable device is implanted into a lesion, the corrosion promoting layer 300 located on the inner wall 120 directly contacts with the blood stream; and the corrosion promoting layer 300 located on the inner wall 120 contains an endothelialization-promoting substance selected from at least one of vascular endothelial growth factors, fibroblast growth factors, granulocyte colony-stimulating factors, estrogen and statins, and/or an antithrombotic drug selected from at least one of anticoagulant, antiplatelet or thrombolytic agents. The corrosion promoting layer 300 located on the inner wall 120 of the iron-based substrate 100 contains an endothelialization-promoting substance and/or an antithrombotic drug to facilitate the rapid attachment of endothelial cells on the inner wall 120 of the iron-based substrate 100, thus avoiding thrombosis and reducing the risk of thrombosis.

It should be noted that the corrosion promoting layer 300 may be a single layer or a plurality of layers. No matter how the corrosion promoting layer 300 is a single layer or a plurality of layers, the thickness of the corrosion promoting layer 300 (it is total thickness when the corrosion promoting layer 300 is a plurality of layers) is rationally configured to ensure that the thickness ratio of the zinc-containing protective layer 200 located on the outer wall 110 to the corrosion promoting layer 300 located on the outer wall 110 is less than the thickness ratio of the zinc-containing protective layer 200 located on the inner wall 120 to the corrosion promoting layer 300 located on the inner wall 120. When the corrosion promoting layer 300 is a plurality of layers, the degradable polymer and the active substance in each layer may be the same or different.

Figure 4:
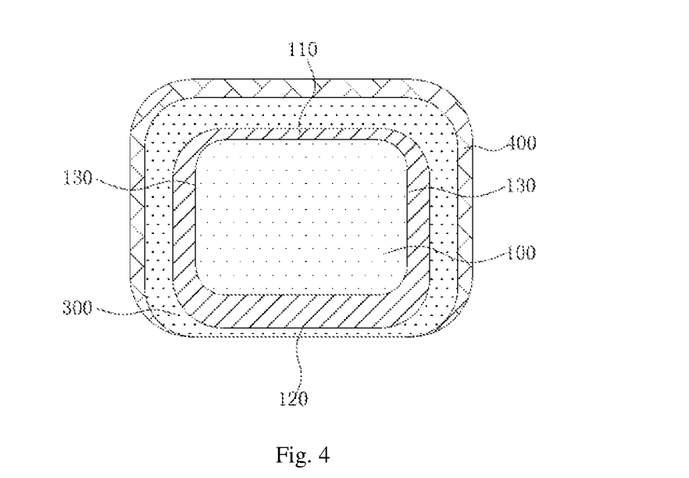
FIG. 4 is a cross-sectional view of an absorbable implantable device in a further embodiment.

Referring to FIG. 4, in one embodiment, the absorbable implantable device further includes a drug loading layer 400; and the drug loading layer 400 at least partially covers the corrosion promoting layer 300. The drug loading layer 400 contains a drug carrier and an active drug. In one embodiment, the drug carrier is a degradable polymer. When the drug carrier is a degradable polymer, the degradable polymer in the drug loading layer 400 may be the same with or different from that in the corrosion promoting layer 200. The active drug may be an antiproliferative agent. In one embodiment, as shown in FIG. 4, the drug loading layer 400 only covers the portions of the corrosion promoting layer 300 located on the outer wall 110 and the side walls 130 of the iron-based substrate 100; and the drug loading layer 400 does not cover the inner wall 120 of the iron-based substrate 100 at all. In one embodiment, the drug loading layer 400 completely covers the corrosion promoting layer 300. When the absorbable implantable device is implanted into a lesion, the drug loading layer 400 located on an inner wall 120 directly contacts with the blood stream; and the drug loading layer 400 contains an endothelialization-promoting substance and/or an antithrombotic drug, and the endothelialization-promoting substance and/or the antithrombotic drug are at least distributed in the drug loading layer 400 located on the inner wall 120 of the iron-based substrate 100, which facilitates the attachment of endothelial cells on the inner wall 120 of the iron-based substrate 100, thus reducing the risk of thrombosis.

In one embodiment, no lamination zone is provided on the drug loading layer 400 and the corrosion promoting layer 300. That is, the drug loading layer 400 partially covers the zinc-containing protective layer 200 and the corrosion promoting layer 300 partially covers the zinc-containing protective layer 200, and the drug loading layer 400 and the corrosion promoting layer 300 are staggered with each other; the drug loading layer 400 does not cover the corrosion promoting layer 300 at all, and the corrosion promoting layer 300 does not cover the drug loading layer 400 at all, either.

In one embodiment, the drug loading layer may be a single layer or a plurality of layers.

In one embodiment, the endothelialization-promoting substance is selected from at least one of vascular endothelial growth factors, fibroblast growth factors, granulocyte colony stimulating factors, estrogen and statins; and the antithrombotic drug is selected from at least one of anticoagulant, antiplatelet and thrombolytic agents. Anticoagulants are heparin agents. The antiplatelet agent is selected from at least one of aspirin, clopidogrel, ticlopidine and dipyridamole. The thrombolytic agent is selected from at least one of urokinase, streptokinase and tissue-type plasminogen activators.

Figure 5:
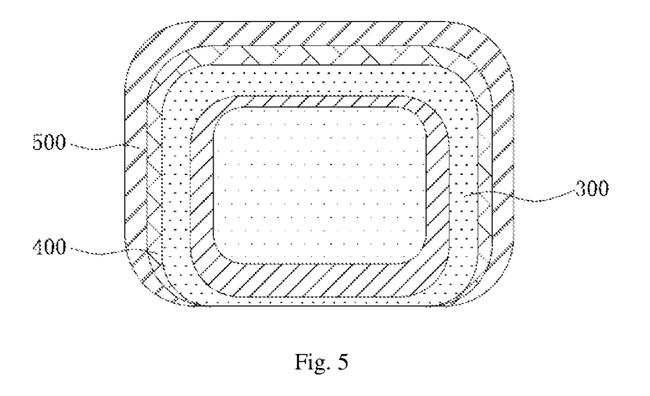
FIG. 5 is a cross-sectional view of an absorbable implantable device in a further embodiment.

Referring to FIG. 5, the absorbable implantable device further includes a sustained-release layer 500; and the sustained-release layer 500 completely covers the drug loading layer 400. The sustained-release layer 500 contains a degradable polymer. The sustained-release layer 500 is degraded to regulate the release of active agents in the drug loading layer 400. The degradable polymer in the sustained-release layer 500 may be the same with or different from the degradable polymer in the corrosion promoting layer 300 and the drug loading layer 400.

In the embodiments, the iron-based substrate 100 is rationally provided with a zinc-containing protective layer 200 and a corrosion promoting layer 300; and the thickness ratio of the zinc-containing protective layer 200 located on the outer wall 110 of the iron-based substrate 100 to the corrosion promoting layer 300 located on the outer wall 110 is less than the thickness ratio of the zinc-containing protective layer 200 located on the inner wall 120 to the corrosion promoting layer 300 located on the inner wall 120, thereby making the corrosion or degradation behavior of the absorbable implantable device matched to the vascular repair process. The corrosion promoting layer 300 and the drug loading layer 400 release the active substance in the degradation process to effectively repair tissues while promoting the rapid endothelialization of the iron-based substrate 100, so as to effectively prevent thrombosis. The iron-based substrate 100 maintains sufficient radial support during vascular repair and is corroded rapidly after vascular repair to avoid long-term clinical risks. The iron-based substrate 100, the zinc-containing protective layer 200, the corrosion promoting layer 300, the drug loading layer 400 and the sustained-release layer 500 are ingeniously combined with each other to effectively ensure the effectiveness and safety of the instrument.

With respect to the preparation of the absorbable implantable device, an iron-based substrate is prepared according to a method known to a person ordinary skill in the art, and then, a zinc-containing protective layer and a corrosion promoting layer are formed on the iron-based substrate by a method known to a person ordinary skill in the art. For example, an iron-based lumen substrate is formed by laser cutting, and a zinc-containing protective layer is formed on the iron-based substrate by electroplating, chemical plating, spray coating, dip coating, brush coating, vapor deposition, magnetron sputtering, ion implantation, inlaying, and other process; afterwards, a corrosion promoting layer covering the zinc-containing protective layer is formed by spray coating, dip coating, brush coating, ink-jet printing, and electrospinning. When the absorbable implantable device further includes a drug loading layer and a sustained-release layer, a drug loading layer and a sustained-release layer at least partially covering the corrosion promoting layer are further formed by a spray coating, dip coating, brushing, ink-jet printing, electrospinning and the like.

The foregoing absorbable implantable device is further set forth by the following detailed examples, but the embodiments are not limited thereto.

The absorbable implantable device in the following examples is an absorbable vascular stent with the specification of 30008. The 30008 stent is defined as follows: under the action of nominal expansion pressure of 8 atm (refer to the pressure used to expand the stent to a nominal diameter), the nominal diameter of the expanded stent is 3.0 mm and the nominal length thereof is 8.0 mm. For the convenience of comparison, the iron-based substrate of the stent employed in the following examples is made of nitrided iron; but the scope of the embodiments is not limited thereto.

The absorbable implantable device may be a device beyond the vascular stent, for example, the absorbable implantable device may be a heart valve stent, a biliary stent, an esophageal stent, a urethral stent, and the like. The specification of the absorbable implantable device is also not limited to 30008, but should match to the requirements of the position to be implanted.

Test methods of the following examples were as follows:

1. Thickness test of a zinc-containing protective layer and a corrosion promoting layer: the test was conducted under a scanning electron microscope; firstly, the absorbable implantable device was subjected to gold spraying (gold/platinum); and for a too long stent, a segment to be observed was cut for gold spraying and subsequent treatment. It was ensured to completely cover the surface of the sent and/or the stent segment. The purpose of gold spraying was to ensure that the coating on the surface of the iron-based substrate was not damaged by the resin for embedding in the subsequent process of sample embedding. The gold-sprayed sample was embedded by a cold embedding resin, and ground step by step based on a coarse-to-fine process to expose the cross section of the stent, and finally polished. The polished sample was pasted onto an objective table of the scanning electron microscope through a conductive adhesive, and then subject to spraying gold again, afterwards, the size of the sample was observed and measured. Three cross sections were selected and polished as uniformly as possible in a length direction of the stent; on the premise of ensuring an intact coating on the surface of the stent, four uniformly distributed stent rods were selected randomly from each cross section to measure the thickness of the zinc-containing protective layer and the corrosion promoting layer on the inner and outer surfaces of the stent struts; and the average value of 12 measured data was taken as average thickness, and then an average thickness ratio was calculated.

2. The degree of thrombosis risk was assessed by evaluating the release behavior and corrosion behavior of the zinc ions in the stent by means of implantation into an animal body:

(1) The animal was euthanized at different time points after the stent was implanted into the animal; and the blood vessel in the stent-implanted segment was taken out to observe whether there was a sign of thrombosis on the surface of the stent, whether the stent was endothelialized and to observe the degree of endothelialization. Complete endothelialization was defined that >95% of the portion was covered by an endothelial cell layer. The stent was separated from vascular tissues to remove the residual tissues from the stent. Further, the stent was placed in an ethyl acetate solution to ensure that the stent was completely immersed; and then the stent was subject to ultrasonic cleaning for 20 min to remove the polymer remaining on the surface. The stent after washing the polymer coating thereon was immersed in a 1 mol/L sodium hydroxide solution to wash off the zinc-containing protective layer remaining on the surface of the stent. After diluting the above cleaning solution, the concentration of zinc ions in the solution was measured by Agilent Spectrum AA 240FS atomic absorption spectroscopy (AAS) to calculate the weight (unit: μg) of the residues of the zinc-containing protective layer on the surface of the stent; then calculate the total amount of zincs which have been corroded and entered into the tissue was calculated accordingly.

(2) The cleaned stent was examined by micro-CT to analyze qualitatively the corrosion. Afterwards, a corrosion product layer on the surface of the stent was removed by ultrasonic cleaning in a tartaric acid solution; and the stent was weighed after being cleaned and dried. The mass loss rate M of the iron-based substrate is defined as a percentage that a mass difference ($M_0-M_t$) between the iron-based substrates before and after implantation accounts for the mass of the iron-based substrate before implantation, and as shown in formula (I).

$$W=(M_0-M_t)/M_0 \times 100\% \quad (I);$$

W—mass loss rate;

$M_t$—mass of the remaining iron-based substrate after implantation;

$M_0$—initial mass of the iron-based substrate before implantation;

where, when the mass loss rate W of the iron-based substrate is less than 5%, it is defined free of corrosion; when the mass loss rate W of the iron-based substrate is not less than 90%, it is defined complete corrosion.

EXAMPLE 1

An absorbable iron-based stent was prepared as follows: a 30008 nitrided iron-based substrate whose mass was 3.8 mg, wall thickness was 50 μm, inner diameter was 1.45 mm and nitrogen content was 0.05 wt. % after laser engraving and polishing was galvanized by vapor deposition to form a zinc-containing protective layer covering the outer wall, inner wall and the side walls of the iron-based substrate; and the thickness of portions of the zinc-containing protective layer located on the outer wall and the inner wall of the iron-based substrate was 0.4 μm. Afterwards, the zinc-containing protective layer was sprayed with a mixed solution of PDLLA(Poly(D,L-lactide)) and ethyl acetate via ink-jet printing to obtain a corrosion promoting layer completely covering the zinc-containing protective layer after the ethyl acetate was volatilized, where the weight average molecular weight of the PDLLA was 200,000. The thickness of the corrosion promoting layer located on the outer wall of the iron-based substrate was 6.7 μm and the thickness of the portion thereof located on the inner wall was 5 μm. The thickness ratio of the zinc-containing protective layer located on the inner wall to the corrosion promoting layer located on the inner wall was 0.08; and the thickness ratio of the zinc-containing protective layer located on the outer wall to the corrosion promoting layer located on the outer wall is 0.06.

The batch of absorbable iron-based stents were implanted into the iliac arteries of a number of rabbits, and then the animals were killed at different follow up timepoints, and the blood vessel in the implanted segment was removed for analysis. The absorbable iron-based stent released 45 μg zincs to tissues 14 days after implantation and was completely endothelialized 30 days after implantation; and 60 days after implantation, it was observed that the iron-based substrate began to corrode. The iron-based substrate was completely corroded 48 months after implantation. No thrombosis was observed in the inner wall of the stent and blood vessels in the implanted segment throughout the follow-up period.

EXAMPLE 2

An absorbable iron-based stent was prepared as follows: a 30008 nitrided iron-based substrate whose mass was 3.8 mg, wall thickness was 50 μm, inner diameter was 1.45 mm and nitrogen content was 0.1 wt. % after laser engraving and polishing was galvanized by electrochemical plating to form a zinc-containing protective layer covering the outer wall, inner wall and the side walls of the iron-based substrate; and the thickness of portions of the zinc-containing protective layer located on the outer wall and the inner wall of the iron-based substrate was 0.8 μm and 1.2 μm respectively. Subsequently, the zinc-containing protective layer was sprayed with a mixed solution of PDLLA and ethyl acetate, where the weight average molecular weight of the PDLLA is 200,000. A core rod with diameter of 0.8 mm was added to the stent during spraying; the core rod can prevent a part of the mixed solution of PDLLA and ethyl acetate from being deposited on the inner wall of the stent. A corrosion promoting layer completely covering the zinc-containing protective layer was obtained after ethyl acetate was volatilized. The thickness of the corrosion promoting layer located on the outer wall of the iron-based substrate was 20 µm and the thickness of the portion thereof located on the inner wall was 12 µm. The thickness ratio of the zinc-containing protective layer located on the inner wall to the corrosion promoting layer located on the inner wall was 0.1; and the thickness ratio of the zinc-containing protective layer located on the outer wall to the corrosion promoting layer located on the outer wall was 0.04.

The batch of absorbable iron-based stents were implanted into the iliac arteries of a number of rabbits, and then the animals were killed at different follow up timepoints, and the blood vessel in the implanted segment was removed for analysis. The absorbable iron-based stent released 100 µg zincs to tissues 14 days after implantation and was completely endothelialized 60 days after implantation; and 60 days after implantation, it was observed that the iron-based substrate began to corrode. The iron-based substrate was completely corroded 18 months after implantation. No thrombosis was observed in the inner wall of the stent and blood vessels of the implanted segment throughout the follow-up period.

EXAMPLE 3

An absorbable iron-based stent was prepared as follows: a 30008 nitrided iron-based substrate whose mass was 3.8 mg, wall thickness was 50 µm, inner diameter was 1.45 mm and nitrogen content was 0.06 wt. % after laser engraving and polishing was galvanized by vapor deposition to form a zinc-containing protective layer covering the outer wall, inner wall and the side walls of the iron-based substrate; and the thickness of portions of the zinc-containing protective layer located on the outer wall and the inner wall of the iron-based substrate was respectively 2.5 µm and 2 µm. Subsequently, the zinc-containing protective layer was sprayed with a mixed solution of PDLLA and ethyl acetate, where the weight average molecular weight of PDLLA was 200,000. A core rod with diameter of 0.5 mm was added to the stent during spraying; the core rod can prevent a part of the mixed solution of PDLLA and ethyl acetate from being deposited on the inner wall of the stent. A corrosion promoting layer completely covering the zinc-containing protective layer was obtained after ethyl acetate was volatilized. The thickness of the corrosion promoting layer located on the outer wall of the iron-based substrate was 35 µm and the thickness of the portion thereof located on the inner wall was 25 µm. The thickness ratio of the zinc-containing protective layer located on the inner wall to the corrosion promoting layer located on the inner wall was 0.08; and the thickness ratio of the zinc-containing protective layer located on the outer wall to the corrosion promoting layer located on the outer wall was 0.07.

The batch of absorbable iron-based stents were implanted into the iliac arteries of a number of rabbits, and then the animals were killed at different follow up timepoints, and the blood vessel in the implanted segment was removed for analysis. The absorbable iron-based stent released 120 µg zincs to tissues 14 days after implantation and was completely endothelialized 75 days after implantation; and 60 days after implantation, it was observed that the iron-based substrate began to corrode. The iron-based substrate was completely corroded 18 months after implantation. No thrombosis was observed in the inner wall of the stent and blood vessels of the implanted segment throughout the follow-up period.

EXAMPLE 4

An absorbable iron-based stent was prepared as follows: a 30008 nitrided iron-based substrate whose mass was 3.8 mg, wall thickness was 50 µm, inner diameter was 1.45 mm and nitrogen content was 0.05 wt. % after laser engraving and polishing was galvanized by electrochemical plating to form a zinc-containing protective layer covering the outer wall, inner wall and the side walls of the iron-based substrate; and the thickness of portions of the zinc-containing protective layer located on the outer wall and the inner wall of the iron-based substrate was 1.2 µm. Subsequently, the zinc-containing protective layer was sprayed with a mixed solution of PDLLA and ethyl acetate, where the weight average molecular weight of PDLLA was 200,000. A core rod with diameter of 0.6 mm was added to the stent during spraying; the core rod can prevent a part of the mixed solution of PDLLA and ethyl acetate from being deposited on the inner wall of the stent. A corrosion promoting layer completely covering the zinc-containing protective layer was obtained after ethyl acetate was volatilized. The thickness of the corrosion promoting layer located on the outer wall of the iron-based substrate was 12 µm and the thickness of the portion thereof located on the inner wall was 8 µm. The thickness ratio of the zinc-containing protective layer located on the inner wall to the corrosion promoting layer located on the inner wall was 0.15; and the thickness ratio of the zinc-containing protective layer located on the outer wall to the corrosion promoting layer located on the outer wall is 0.1.

The batch of absorbable iron-based stents were implanted into the iliac arteries of a number of rabbits, and then the animals were killed at different follow up timepoints, and the blood vessel in the implanted segment was removed for analysis. The absorbable iron-based stent released 45 µg zincs to tissues 14 days after implantation and was completely endothelialized 30 days after implantation; and 120 days after implantation, it was observed that the iron-based substrate began to corrode. The iron-based substrate was completely corroded 30 months after implantation. No thrombosis was observed in the inner wall of the stent and blood vessels of the implanted segment throughout the follow-up period.

EXAMPLE 5

An absorbable iron-based stent was prepared as follows: a 30008 nitrided iron-based substrate whose mass was 3.8 mg, wall thickness was 50 µm, inner diameter was 1.45 mm and nitrogen content was 0.05 wt. % after laser engraving and polishing was galvanized by electrochemical plating to form a zinc-containing protective layer covering the outer wall, inner wall and the side walls of the iron-based substrate; and the thickness of portions of the zinc-containing protective layer located on the outer wall and the inner wall of the iron-based substrate was 1.2 µm. Subsequently, the zinc-containing protective layer was sprayed with a mixed solution of PDLLA and ethyl acetate, where the weight average molecular weight of PDLLA was 200,000. A core rod with diameter of 0.9 mm was added to the stent during spraying; the core rod can prevent a part of the mixed solution of PDLLA and ethyl acetate from being deposited on the inner wall of the stent. A corrosion promoting layer completely covering the zinc-containing protective layer was obtained after ethyl acetate was volatilized. The thickness of the corrosion promoting layer located on the outer wall of the iron-based substrate was 10 µm and the thickness of the portion thereof located on the inner wall was 6 µm. The thickness ratio of the zinc-containing protective layer located on the inner wall to the corrosion promoting layer located on the inner wall was 0.2; and the thickness ratio of the zinc-containing protective layer located on the outer wall to the corrosion promoting layer located on the outer wall was 0.12.

The batch of absorbable iron-based stents were implanted into the iliac arteries of a number of rabbits, and then the animals were killed at different follow up timepoints, and the blood vessel in the implanted segment was removed for analysis. The absorbable iron-based stent released 30 µg zincs to tissues 14 days after implantation and was completely endothelialized 24 days after implantation; and 180 days after implantation, it was observed that the iron-based substrate started to be corroded. The iron-based substrate was completely corroded 36 months after implantation. No thrombosis was observed in the inner wall of the stent and blood vessels of the implanted segment throughout the follow-up period.

EXAMPLE 6

An absorbable iron-based stent was prepared as follows: a 30008 nitrided iron-based substrate whose mass was 3.8 mg, wall thickness was 50 µm, inner diameter was 1.45 mm and nitrogen content was 0.05 wt. % after laser engraving and polishing was galvanized by electrochemical plating to form a zinc-containing protective layer covering the outer wall, inner wall and the side walls of the iron-based substrate; and the thickness of portions of the zinc-containing protective layer located on the outer wall and the inner wall of the iron-based substrate was 1.2 µm. Subsequently, the zinc-containing protective layer was sprayed with a mixed solution of PDLLA and ethyl acetate, where the weight average molecular weight of PDLLA was 200,000. A core rod with diameter of 1.0 mm was added to the stent during spraying; the core rod can prevent a part of the mixed solution of PDLLA and ethyl acetate from being deposited on the inner wall of the stent. A corrosion promoting layer completely covering the zinc-containing protective layer was obtained after ethyl acetate was volatilized. The thickness of the corrosion promoting layer located on the outer wall of the iron-based substrate was 15 µm and the thickness of the portion thereof located on the inner wall was 6 µm. The thickness ratio of the zinc-containing protective layer located on the inner wall to the corrosion promoting layer located on the inner wall was 0.2; and the thickness ratio of the zinc-containing protective layer located on the outer wall to the corrosion promoting layer located on the outer wall was 0.08.

The batch of absorbable iron-based stents were implanted into the iliac arteries of a number of rabbits, and then the animals were killed at different follow up timepoints, and the blood vessel in the implanted segment was removed for analysis. The absorbable iron-based stent released 60 µg zincs to tissues 14 days after implantation and was completely endothelialized 24 days after implantation; and 90 days after implantation, it was observed that the iron-based substrate began to corrode. The iron-based substrate was completely corroded 24 months after implantation. No thrombosis was observed in the inner wall of the stent and blood vessels of the implanted segment throughout the follow-up period.

EXAMPLE 7

An absorbable iron-based stent was prepared as follows: a 30008 nitrided iron-based substrate whose mass was 3.8 mg, wall thickness was 50 µm, inner diameter was 1.45 mm and nitrogen content was 0.05 wt. % after laser engraving and polishing was galvanized by electrochemical plating to form a zinc-containing protective layer covering the outer wall, inner wall and the side walls of the iron-based substrate; and the thickness of portions of the zinc-containing protective layer located on the outer wall and the inner wall of the iron-based substrate was 1.2 µm. Subsequently, the zinc-containing protective layer was sprayed with a mixed solution of PDLLA and ethyl acetate, where the weight average molecular weight of PDLLA was 200,000. A core rod with diameter of 0.6 mm was added to the stent during spraying; the core rod can prevent a part of the mixed solution of PDLLA and ethyl acetate from being deposited on the inner wall of the stent. A first PDLLA coating completely covering the zinc-containing protective layer was obtained upon evaporation of the ethyl acetate. Further, a core rod with diameter of 1.45 mm was added to the stent, and the stent was continuously sprayed a mixed solution of PDLLA, rapamycin and ethyl acetate, and dried to form a second PDLLA coating on the iron-based substrate; the second PDLLA coating covers portions of the first PDLLA coating located on the outer wall and the side walls; moreover, the first PDLLA coating located on the inner wall was not covered by the second PDLLA coating. The first PDLLA coating and the second PDLLA coating formed a corrosion promoting layer. The thickness of the corrosion promoting layer located on the outer wall of the iron-based substrate was 7.5 µm and the thickness of the portion thereof located on the inner wall was 5 µm. The thickness ratio of the section of the zinc-containing protective layer located on the inner wall to the section of the corrosion promoting layer located on the inner wall was 0.24; and the thickness ratio of the zinc-containing protective layer located on the outer wall to the corrosion promoting layer located on the outer wall was 0.16.

The batch of absorbable iron-based stents were implanted into the iliac arteries of a number of rabbits, and then the animals were killed at different follow up timepoints, and the blood vessel in the implanted segment was removed for analysis. The absorbable iron-based stent released 60 µg zincs to tissues 14 days after implantation and was completely endothelialized 45 days after implantation; and 90 days after implantation, it was observed that the iron-based substrate began to corrode. The iron-based substrate was completely corroded 42 months after implantation. No thrombosis was observed in the inner wall of the stent and blood vessels of the implanted segment throughout the follow-up period.

EXAMPLE 8

An absorbable iron-based stent was prepared as follows: a 30008 nitrided iron-based substrate whose mass was 3.8 mg, wall thickness was 50 µm, inner diameter was 1.45 mm and nitrogen content was 0.08 wt. % after laser engraving and polishing was galvanized by a chemical process to form a zinc-containing protective layer covering the outer wall, inner wall and the side walls of the iron-based substrate; and the thickness of the zinc-containing protective layer located on the outer wall and the inner wall of the iron-based substrate was 3.6 μm. Subsequently, the zinc-containing protective layer was sprayed with a mixed solution of PDLLA, rapamycin and ethyl acetate, where the weight average molecular weight of PDLLA was 200,000. A core rod with diameter of 0.5 mm was added to the stent during spraying; the core rod can prevent a part of the mixed solution of PDLLA, rapamycin and ethyl acetate from being deposited on the inner wall of the stent. A corrosion promoting layer completely covering the zinc-containing protective layer was obtained after ethyl acetate was volatilized. The thickness of the corrosion promoting layer located on the outer wall of the iron-based substrate was 13.3 μm and the thickness of the layer thereof located on the inner wall was 9.5 μm. The thickness ratio of the zinc-containing protective layer located on the inner wall to the corrosion promoting layer located on the inner wall was 0.38; and the thickness ratio of the zinc-containing protective layer located on the outer wall to the corrosion promoting layer located on the outer wall was 0.27.

The batch of absorbable iron-based stents were implanted into the iliac arteries of a number of rabbits, and then the animals were killed at different follow up timepoints, and the blood vessel in the implanted segment was removed for analysis. The absorbable iron-based stent released 60 μg zincs to tissues 14 days after implantation and was completely endothelialized 45 days after implantation; and 270 days after implantation, it was observed that the iron-based substrate started to be corroded. The iron-based substrate was completely corroded 54 months after implantation. No thrombosis was observed in the inner wall of the stent and blood vessels of the implanted segment throughout the follow-up period.

EXAMPLE 9

An absorbable iron-based stent was prepared as follows: a 30008 nitrided iron-based substrate whose mass was 3.8 mg, wall thickness was 50 μm, inner diameter was 1.45 mm and nitrogen content was 0.1 wt. % after laser engraving and polishing was galvanized by electrochemical plating to form a zinc-containing protective layer covering the outer wall, inner wall and the side walls of the iron-based substrate on the iron-based substrate; and the thicknesses of the zinc-containing protective layer located on the outer wall and the inner wall of the iron-based substrate were 0.8 μm and 1.2 μm, respectively. Subsequently, the zinc-containing protective layer was sprayed with a mixed solution of PDLLA and ethyl acetate, where the weight average molecular weight of PDLLA was 200,000. A corrosion promoting layer completely covering the zinc-containing protective layer was obtained after ethyl acetate was volatilized. The thickness of the corrosion promoting layer located on the outer wall and the inner wall of the iron-based substrate was 3.5 μm. The thickness ratio of the zinc-containing protective layer located on the inner wall to the corrosion promoting layer located on the inner wall was 0.34; and the thickness ratio of the zinc-containing protective layer located on the outer wall to the corrosion promoting layer located on the outer wall was 0.23.

The batch of absorbable iron-based stents were implanted into the iliac arteries of a number of rabbits, and then the animals were killed at different follow up timepoints, and the blood vessel in the implanted segment was removed for analysis. The absorbable iron-based stent released 120 μg zincs to tissues 14 days after implantation and was completely endothelialized 75 days after implantation; and 60 days after implantation, it was observed that the iron-based substrate began to corrode. The iron-based substrate was completely corroded 54 months after implantation. No thrombosis was observed in the inner wall of the stent and blood vessels of the implanted segment throughout the follow-up period.

EXAMPLE 10

An absorbable iron-based stent was prepared as follows: a 30008 nitrided iron-based substrate whose mass was 3.8 mg, wall thickness was 50 μm, inner diameter was 1.45 mm and nitrogen content was 0.05 wt. % after laser engraving and polishing was galvanized by vapor deposition to form a zinc-containing protective layer covering the outer wall, inner wall and the side walls of the iron-based substrate; and the thickness of the zinc-containing protective layer located on the outer wall and the inner wall of the iron-based substrate was 0.4 μm. Afterwards, the zinc-containing protective layer was sprayed with a mixed solution of PDLLA and ethyl acetate via ink-jet printing to obtain a corrosion promoting layer completely covering the zinc-containing protective layer after the ethyl acetate was volatilized, where the weight average molecular weight of the PDLLA was 200,000. The thickness of the corrosion promoting layer located on the outer wall of the iron-based substrate was 6.7 μm and the thickness of the layer thereof located on the inner wall was 5 μm. Subsequently, the zinc-containing protective layer was sprayed with a mixed solution of PDLLA, rapamycin and ethyl acetate, where the weight average molecular weight of PDLLA was 200,000. A core rod with diameter of 1.2 mm was added to the stent during spraying; the core rod can prevent a part of the mixed solution of PDLLA, rapamycin and ethyl acetate from being deposited on the inner wall of the stent. After drying, a first drug loading layer covering the corrosion promoting layer located on the outer and inner walls was obtained. Further, the first drug loading layer was sprayed with a mixed solution of PDLLA, vascular endothelial growth factor, urokinase and ethyl acetate, where the weight average molecular weight of the PDLLA was 50,000. After drying, a second drug loading layer covering the first drug loading layer was formed. The thickness ratio of the zinc-containing protective layer located on the inner wall to the corrosion promoting layer located on the inner wall was 0.08; and the thickness ratio of the zinc-containing protective layer located on the outer wall to the corrosion promoting layer located on the outer wall was 0.06.

The batch of absorbable iron-based stents were implanted into the iliac arteries of a number of rabbits, and then the animals were killed at different follow up timepoints, and the blood vessel in the implanted segment was removed for analysis. The absorbable iron-based stent released 45 μg zincs to tissues 14 days after implantation and was completely endothelialized 20 days after implantation; and 60 days after implantation, it was observed that the iron-based substrate started to be corroded. The iron-based substrate was completely corroded 48 months after implantation. No thrombosis was observed in the inner wall of the stent and blood vessels of the implanted segment throughout the follow-up period.

EXAMPLE 11

An absorbable iron-based stent was prepared as follows: a 30008 nitrided iron-based substrate whose mass was 3.8 mg, wall thickness was 50 µm, inner diameter was 1.45 mm and nitrogen content was 0.05 wt. % after laser engraving and polishing was galvanized by vapor deposition to form a zinc-containing protective layer covering the outer wall, inner wall and the side walls of the iron-based substrate; and the thickness of the zinc-containing protective layer located on the outer wall and the inner wall of the iron-based substrate was 1.2 µm. Afterwards, the zinc-containing protective layer was sprayed with a mixed solution of PDLLA and ethyl acetate via ink-jet printing to obtain a corrosion promoting layer completely covering the zinc-containing protective layer after the ethyl acetate was volatilized, where the weight average molecular weight of the PDLLA was 200,000. The thickness of the corrosion promoting layer located on the outer wall of the iron-based substrate was 4 µm and the thickness of the layer thereof located on the inner wall was 3.5 µm. The thickness ratio of the zinc-containing protective layer located on the inner wall to the corrosion promoting layer located on the inner wall was 0.34; and the thickness ratio of the zinc-containing protective layer located on the outer wall to the corrosion promoting layer located on the outer wall was 0.3.

The batch of absorbable iron-based stents were implanted into the iliac arteries of a number of rabbits, and then the animals were killed at different follow up timepoints, and the blood vessel in the implanted segment was removed for analysis. The absorbable iron-based stent released 130 µg zincs to tissues 14 days after implantation and was completely endothelialized 75 days after implantation; and 70 days after implantation, it was observed that the iron-based substrate began to corrode. The iron-based substrate was completely corroded 55 months after implantation. No thrombosis was observed in the inner wall of the stent and blood vessels of the implanted segment throughout the follow-up period.

EXAMPLE 12

An absorbable iron-based stent was prepared as follows: a 30008 nitrided iron-based substrate whose mass was 3.8 mg, wall thickness was 50 µm, inner diameter was 1.45 mm and nitrogen content was 0.05 wt. % after laser cutting and polishing was deposited by evaporation with a zinc-containing protective layer covering the outer wall, inner wall and the side walls of the iron-based substrate. The zinc-containing protective layer completely covered the inner wall of the iron-based substrate, but partially covered the outer wall of the iron-based substrate; the area coverage rate (surface area of the zinc-containing protective layer/surface area of the iron-based substrate) of the zinc-containing protective layer on the outer wall was 90%; and the average thickness of the zinc-containing protective layer on the outer wall and the inner wall of the iron-based substrate was 1.2 µm. Subsequently, the zinc-containing protective layer was sprayed with a mixed solution of PDLLA and ethyl acetate, where the weight average molecular weight of PDLLA was 200,000. A core rod with diameter of 0.6 mm was added to the stent during spraying; the core rod can prevent a part of the mixed solution of PDLLA and ethyl acetate from being deposited on the inner wall of the stent. A corrosion promoting layer completely covering the zinc-containing protective layer was obtained after ethyl acetate was volatilized. The thickness of the corrosion promoting layer located on the outer wall of the iron-based substrate was 12 µm and the thickness of the layer thereof located on the inner wall was 8 µm. The thickness ratio of the zinc-containing protective layer located on the inner wall to the corrosion promoting layer located on the inner wall was 0.15; and the thickness ratio of the zinc-containing protective layer located on the outer wall to the corrosion promoting layer located on the outer wall was 0.1.

The batch of absorbable iron-based stents were implanted into the iliac arteries of a number of rabbits, and then the animals were killed at different follow up timepoints, and the blood vessel in the implanted segment was removed for analysis. The absorbable iron-based stent released 40 µg zincs to tissues 14 days after implantation and was completely endothelialized 30 days after implantation; and 100 days after implantation, it was observed that the iron-based substrate began to corrode. The iron-based substrate was completely corroded 26 months after implantation. No thrombosis was observed in the inner wall of the stent and blood vessels of the implanted segment throughout the follow-up period.

EXAMPLE 13

An absorbable iron-based stent was prepared as follows: a 30008 nitrided iron-based substrate whose mass was 3.8 mg, wall thickness was 50 µm, inner diameter was 1.45 mm and nitrogen content was 0.05 wt. % after laser engraving and polishing was galvanized by electrochemical plating to form a zinc-containing protective layer covering the outer wall, inner wall and the side walls of the iron-based substrate; and the thickness of the zinc-containing protective layer located on the outer wall and the inner wall of the iron-based substrate was 1.2 µm. Afterwards, the zinc-containing protective layer was sprayed with a mixed solution of PDLLA and ethyl acetate via ink-jet printing to obtain a PDLLA corrosion promoting layer after the ethyl acetate was volatilized, where the weight average molecular weight of the PDLLA was 200,000. The corrosion promoting layer completely covered the outer wall of the iron-based substrate, but partially covered the inner wall of the iron-based substrate only; and the area coverage rate (surface area of the zinc-containing protective layer/surface area of the zinc-containing protective layer) of the corrosion promoting layer on the inner wall was 90%. The thickness of the corrosion promoting layer located on the outer wall of the iron-based substrate was 12 µm and the average thickness of the layer thereof located on the inner wall was 8 µm. The thickness ratio of the zinc-containing protective layer located on the inner wall to the corrosion promoting layer located on the inner wall was 0.15; and the thickness ratio of the zinc-containing protective layer located on the outer wall to the corrosion promoting layer located on the outer wall was 0.1.

The batch of absorbable iron-based stents were implanted into the iliac arteries of a number of rabbits, and then the animals were killed at different follow up timepoints, and the blood vessel in the implanted segment was removed for analysis. The absorbable iron-based stent released 50 µg zincs to tissues 14 days after implantation and was completely endothelialized 40 days after implantation; and 90 days after implantation, it was observed that the iron-based substrate began to corrode. The iron-based substrate was completely corroded 30 months after implantation. No thrombosis was observed in the inner wall of the stent and blood vessels of the implanted segment throughout the follow-up period.

COMPARATIVE EXAMPLE 1

An absorbable iron-based stent was prepared as follows: a 30008 nitrided iron-based substrate whose mass was 3.8 mg, wall thickness was 50 µm, inner diameter was 1.45 mm and nitrogen content was 0.05 wt. % after laser engraving and polishing was galvanized by electrochemical plating to form a zinc-containing protective layer covering the outer wall, inner wall and the side walls of the iron-based substrate; and the thickness of portions of the zinc-containing protective layer located on the outer wall and the inner wall of the iron-based substrate was 1.2

The batch of absorbable iron-based stents were implanted into the iliac arteries of a number of rabbits, and then the animals were killed at different follow up timepoints, and the blood vessel in the implanted segment was removed for analysis. The absorbable iron-based stent released 150 µg zincs to tissues 14 days after implantation and was completely endothelialized 90 days after implantation; and 180 days after implantation, it was observed that the iron-based substrate began to corrode; and the iron-based substrate was completely corroded 60 months after implantation. In addition, mural thrombus can be seen partially on the inner wall of the stent.

Compared with Examples 4-7 and 12-13, the absorbable iron-based stent in Comparative Example 1 exhibited a faster release rate of zinc, resulting in higher thrombogenicity, and delays in the time of complete endothelialization to some extent; moreover, the iron-based substrate-initiated corrosion at a proper time point, but had a longest cycle of complete corrosion.

COMPARATIVE EXAMPLE 2

An absorbable iron-based stent was prepared as follows: a 30008 nitrided iron-based substrate whose mass was 3.8 mg, wall thickness was 50 µm, inner diameter was 1.45 mm and nitrogen content was 0.05 wt. % after laser engraving and polishing was galvanized by electrochemical plating to form a zinc-containing protective layer covering the outer wall, inner wall and the side walls of the iron-based substrate; and the thickness of portions of the zinc-containing protective layer located on the outer wall and the inner wall of the iron-based substrate was 1.2 µm. Afterwards, the zinc-containing protective layer was sprayed with a mixed solution of PDLLA and ethyl acetate via ink-jet printing to obtain a corrosion promoting layer completely covering the zinc-containing protective layer after the ethyl acetate was volatilized, where the weight average molecular weight of the PDLLA was 200,000. The thickness of portions of the corrosion promoting layer located on the outer wall and the inner wall of the iron-based substrate was 40 µm. The thickness ratio of the zinc-containing protective layer located on the inner wall to the corrosion promoting layer located on the inner wall was 0.03; and the thickness ratio of the zinc-containing protective layer located on the outer wall to the corrosion promoting layer located on the outer wall was 0.03.

The batch of absorbable iron-based stents were implanted into the iliac arteries of a number of rabbits, and then the animals were killed at different follow up timepoints, and the blood vessel in the implanted segment was removed for analysis. The absorbable iron-based stent released 150 µg zincs to tissues 14 days after implantation, and was completely endothelialized 120 days after implantation; and 30 days after implantation, it was observed that the iron-based substrate began to corrode; and the iron-based substrate was completely corroded 12 months after implantation. In addition, mural thrombus can be seen partially on the inner wall of the stent.

Compared with Examples 4-7, the absorbable iron-based stent in Comparative Example 2 exhibited a faster release rate of zinc, resulting in higher thrombogenicity, and delays in complete endothelialization time; moreover, the iron-based substrate initiated corrosion earlier.

COMPARATIVE EXAMPLE 3

An iron-based absorbable stent was prepared as follows: a nitrided iron-based substrate having an outer diameter of 1.6 mm and wall thickness of 85 µm (iron content≥99.9 wt %) was subject to laser engraving and chemical polishing to obtain a 30008 bare stent. The stent had mass of 3.8 mg, wall thickness of 50 µm and an inner diameter of 1.45 mm.

The batch of absorbable iron-based stents were implanted into the iliac arteries of a number of rabbits, and then the animals were killed at different follow up timepoints, and the blood vessel in the implanted segment was removed for analysis. The absorbable iron-based substrate had been completely endothelialized 14 days after implantation; and it was observed that the iron-based substrate started to be corroded at the same time point. The iron-based substrate was completely corroded 60 months after implantation. No thrombosis was observed in the inner wall of the stent and blood vessels of the implanted segment throughout the follow-up period.

Compared with all examples, the absorbable iron-based stent of Comparative Example 3 initiated corrosion at the earliest but had a longer cycle of complete corrosion remarkably.

The technical features of the above examples may be combined in any combination, and in order to simplify the description, all possible combinations of the technical features in the above examples are not described one by one. Moreover, the combinations of these technical features should fall within the scope of the description as long as there is no discrepancy among the combinations thereof.

The examples set forth above merely represent several embodiments, and are described in greater detail but are not limiting. It should be appreciated that a person of ordinary skill in the art can further make numerous variations and improvements without departing from the spirit of the embodiments.

The invention claimed is:

1. An absorbable implantable device comprising: an iron-based substrate having an outer wall and an inner wall, the absorbable implantable device further comprising a zinc-containing protective layer and a corrosion promoting layer disposed on the iron-based substrate, the zinc-containing protective layer covers the outer wall and the inner wall of the iron-based substrate; the corrosion promoting layer covers the zinc-containing protective layer;
   wherein the iron-based substrate is made of pure iron or an iron alloy; the pure iron has a purity of not less than 99.9 wt. %, and alloying elements in the iron alloy are selected from at least one of carbon, nitrogen, phosphorus, silicon, sulfur, boron, cobalt, tungsten, manganese, tin, magnesium, zinc, zirconium, calcium, titanium, copper, gold, silver, platinum and palladium;
   wherein the thickness ratio of the zinc-containing protective layer located on the inner wall to the corrosion promoting layer located on the inner wall is in a range from 0.08 to 0.38;
   wherein the thickness ratio of the zinc-containing protective layer located on the outer wall to the corrosion promoting layer located on the outer wall is in a range from 0.04 to 0.27; and the thickness ratio of the zinc-containing protective layer located on the outer wall to the corrosion promoting layer located on the outer wall is less than the thickness ratio of the zinc-containing protective layer located on the inner wall to the corrosion promoting layer located on the inner wall.

2. The absorbable implantable device according to claim 1, wherein the zinc-containing protective layer completely covers the inner wall of the iron-based substrate, and the zinc-containing protective layer at least partially covers the outer wall of the iron-based substrate; the corrosion promoting layer completely covers the outer wall of the iron-based substrate, and the corrosion promoting layer at least partially covers the inner wall of the iron-based substrate.

3. The absorbable implantable device according to claim 1, wherein the thickness of the zinc-containing protective layer located on the outer wall is not equal to the thickness of the zinc-containing protective layer located on the inner wall.

4. The absorbable implantable device according to claim 1, wherein the thickness of the corrosion promoting layer located on the outer wall is not equal to the thickness of the corrosion promoting layer located on the inner wall.

5. The absorbable implantable device according to claim 1, wherein the thickness of the zinc-containing protective layer located on the inner wall is in a range from 0.4 to 3.6 microns.

6. The absorbable implantable device according to claim 1, wherein the thickness ratio of the zinc-containing protective layer located on the inner wall to the corrosion promoting layer located on the inner wall is in a range from 0.10 to 0.24; and the thickness of the zinc-containing protective layer located on the inner wall is in a range from 0.4 to 3.6 microns.

7. The absorbable implantable device according to claim 1, wherein the thickness of the zinc-containing protective layer located on the outer wall is in a range from 0.4 to 3.6 microns.

8. The absorbable implantable device according to claim 1, wherein the thickness ratio of the zinc-containing protective layer located on the outer wall to the corrosion promoting layer located on the outer wall is in a range from 0.04 to 0.12; and the thickness of the zinc-containing protective layer located on the outer wall is in a range from 0.4 to 3.6 microns.

9. The absorbable implantable device according to claim 1, wherein the zinc-containing protective layer is made of pure zinc or a zinc alloy; the pure zinc has a purity of not less than 99.9 wt. %; and alloying elements in the zinc alloy are selected from at least one of sodium, potassium, magnesium, lithium, calcium, strontium, manganese, iron, tin, germanium, boron, silicon, copper, bismuth, silver and zirconium.

10. The absorbable implantable device according to claim 1, wherein the corrosion promoting layer comprises a degradable polymer; and the degradable polymer is selected from at least one of a degradable polyester and a degradable anhydride; the degradable polyester is selected from at least one of polylactic acid, polyglycolic acid, poly(lactic-co-glycolic acid), polycaprolactone, polyacrylate, polyhydroxyalkanoate, polysuccinate, poly(anhydride-ester) derived from salicylic acid, polytrimethylene carbonate, polydioxanone, poly(beta-alkanoate), poly(beta-hydroxybutyrate), polyethylene glycol oxalate, and poly(hydroxybutyrate-hydroxyvalerate); and the degradable polyanhydride is selected from at least one of poly-1,3-bis (p-carboxyphenoxy) propane-decanedioic acid, polyerucic acid dimer-decanedioic acid and polyfumaric acid-decanedioic acid; or, the degradable polymer is copolymerized by at least two of monomers for forming polylactic acid, polyglycolic acid, poly(lactic-co-glycolic acid), polycaprolactone, polyacrylate, polyhydroxyalkanoate, polysuccinate, Salicylic acid-based poly(anhydride-ester), polytrimethylene carbonate, polydioxanone, poly(beta-alkanoate), poly(beta-hydroxybutyrate), polyethylene glycol oxalate and poly(hydroxybutyrate-hydroxyvalerate); and monomers for forming poly-1, 3-bis(p-carboxyphenoxy) propane-decanedioic acid, polyerucic acid dimer-decanedioic acid, and polyfumaric acid-decanedioic acid.

11. The absorbable implantable device according to claim 1, wherein the zinc-containing protective layer further covers at least two side walls of the iron-based substrate, the corrosion promoting layer further covers the zinc-containing protective layer on the at least two side walls of the iron-based substrate; and
   each of the sections of the corrosion promoting layer located on the outer wall, the inner wall, and the two side walls further comprises an active substance; or,
   the sections of the corrosion promoting layer located on the outer wall and the two side walls further comprise the active substance, while the section of the corrosion promoting layer located on the inner wall is free of the active substance; or,
   each of the sections of the corrosion promoting layer located on the outer wall, the inner wall, and the two side walls further comprises the active substance, and the content of the active substance on the outer and side walls is greater than the content thereof on the inner wall.

12. The absorbable implantable device according to claim 1, wherein the corrosion promoting layer located on the inner wall comprises an endothelialization-promoting substance selected from at least one of vascular endothelial growth factors, fibroblast growth factors, granulocyte colony-stimulating factors, estrogen, and statins, and/or an antithrombotic drug selected from at least one of anticoagulant, antiplatelet or thrombolytic agents.

13. The absorbable implantable device according to claim 1, wherein the absorbable implantable device further comprises a drug loading layer; and the drug loading layer at least partially covers the corrosion promoting layer; alternatively, the drug loading layer partially covers the zinc-containing protective layer; the corrosion promoting layer partially covers the zinc-containing protective layer, and there is no overlapping zone of the drug loading layer and the corrosion promoting layer.

14. The absorbable implantable device according to claim 13, wherein the drug loading layer located on the inner wall of the iron-based substrate comprises an endothelialization-promoting substance selected from at least one of vascular endothelial growth factors, fibroblast growth factors, granulocyte colony-stimulating factors, estrogen, and statins, and/or an antithrombotic drug selected from at least one of anticoagulant, antiplatelet or thrombolytic agents.

* * * * *